Figure 1:
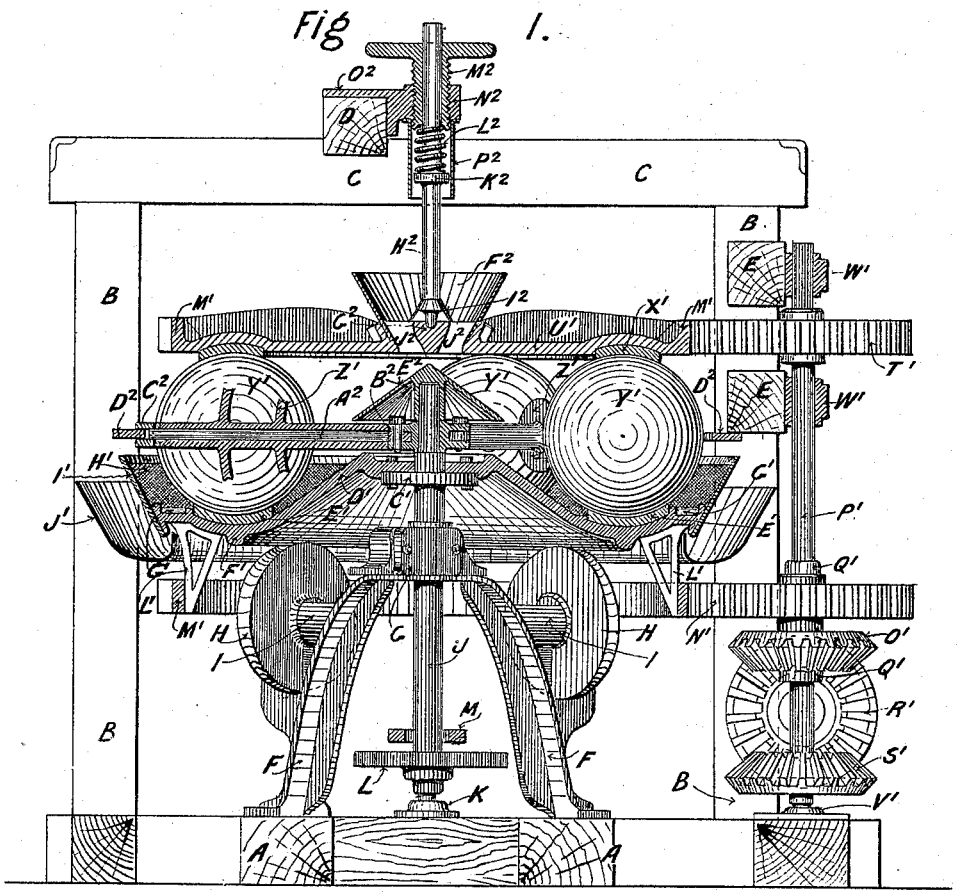

(No Model.) 7 Sheets—Sheet 1.

A. TORNAGHI.
ORE PULVERIZER.

No. 537,947. Patented Apr. 23, 1895.

Witness:
E. K. Sturtevant
H. van Oldenneel

Inventor:
Angelo Tornaghi,
by (No Model.) 7 Sheets—Sheet 4.

A. TORNAGHI.
ORE PULVERIZER.

No. 537,947. Patented Apr. 23, 1895.

Witness:
E. K. Sturtevant
H. van Idenneek

Inventor:-
Angelo Tornaghi (No Model.) 7 Sheets—Sheet 5.

A. TORNAGHI.
ORE PULVERIZER.

No. 537,947. Patented Apr. 23, 1895.

Witness:
E. H. Sturtevant
H. van Oldenneel

Inventor:—
Angelo Tornaghi.
by Richards (No Model.)  
A. TORNAGHI.  
ORE PULVERIZER.  
7 Sheets—Sheet 6.
No. 537,947. Patented Apr. 23, 1895.
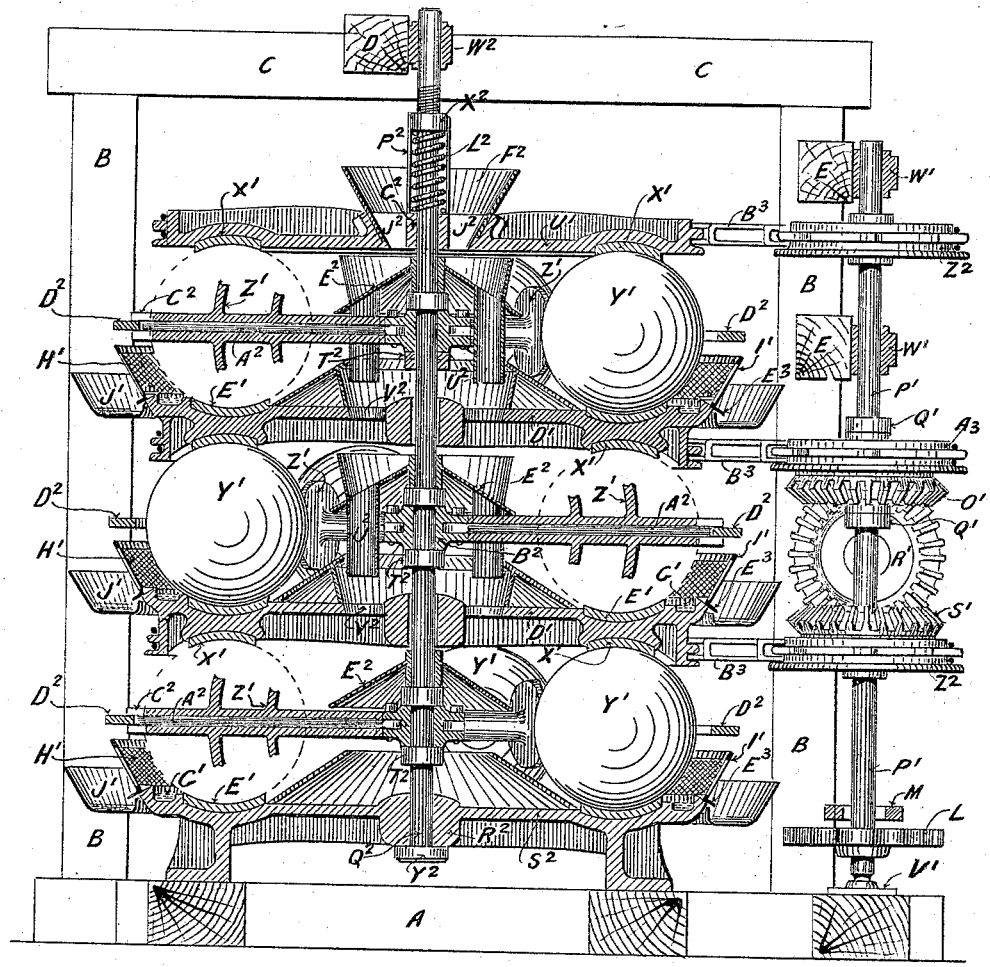
Fig 8.
Fig 9.
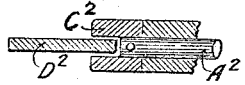
Fig 9.ᴬ
Fig 10.
Witnesses:
E. H. Sturtevant
H. van Oldennell
Inventor:
Angelo Tornaghi,
by Richards
attys (No Model.) 7 Sheets—Sheet 7.

A. TORNAGHI.
ORE PULVERIZER.

No. 537,947. Patented Apr. 23, 1895.

Witness:
E. H. Sturtevant
H. van Deventer

Inventor:-
Angelo Tornaghi

UNITED STATES PATENT OFFICE.

ANGELO TORNAGHI, OF SYDNEY, NEW SOUTH WALES.

ORE-PULVERIZER.

SPECIFICATION forming part of Letters Patent No. 537,947, dated April 23, 1895.

Application filed November 23, 1894. Serial No. 529,755. (No model.)

*To all whom it may concern:*

Be it known that I, ANGELO TORNAGHI, mathematical-instrument maker, a subject of the Queen of Great Britain, residing at Sydney, in the Colony of New South Wales, have invented a new and useful Improvement in Ore-Pulverizers; and I do hereby declare that the following is a full, clear, and exact description of the invention, which will enable others skilled in the art to which it appertains to make and use the same.

The object of my invention is to improve that class of pulverizers where trays are used upon which any number of balls are made to revolve, the material to be treated being fed upon the roller path, the rotation of a super-imposed weight operating the said balls, the said machine being also provided with an attachment for operating, amalgamating and concentrating appliances such as are usually employed for saving precious metals.

In carrying out my improvements I construct both the bottom tray and the super-imposed tray so as to cause them to revolve preferably in contrary directions. The bottom tray is supported upon friction rollers or upon a series of balls. By causing the trays to revolve in contrary directions the crushing spheres are more rapidly rotated and the process of pulverization more speedily effected.

The crushing spheres I make preferably hollow, of cast steel or other suitable metal. These are kept apart by rollers formed with flanges so placed as to prevent the displacement of the spheres. The spindles carrying these rollers are attached to the center spindle and are supported at their outer ends upon a track attached to the framework of the machine. The use of the friction rollers combined with the revolution of the trays in contrary directions minimizes the amount of power necessary to actuate the trays and the crushing spheres. I am able to construct a series of these trays. Any desired number may be used, placed in tiers. The friction rollers would, in this case, be the spheres placed in the lowest tray. The super-imposed tray would be constructed with two roller paths, one for the friction spheres, and the other for carrying the crushing spheres placed above. This order might be repeated according to the crushing efficiency required. The trays would be independent of each other, and would be rotated by means of spur gearing, friction wheels, driving rope, endless chain, or other known appliances. In the case where the bottom tray is rotated, it is supported upon a vertical spindle, to which is attached a peculiarly constructed tappet wheel for operating a lever or a series of levers and cranks attached to the various appliances which are used in conjunction with crushing machinery for the purpose of imparting to them an oscillating and vibratory movement. In the case where the bottom tray is stationary, the aforesaid tappet wheel may be attached either to the main driving, or, the intermediate, shafts.

Reference will now be made to the accompanying drawings.

Figure 2:
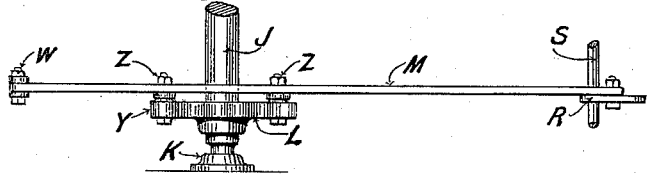
Figure 3:
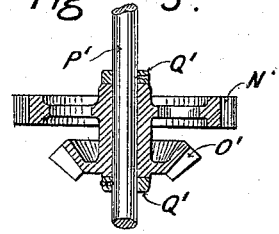
Figure 4:
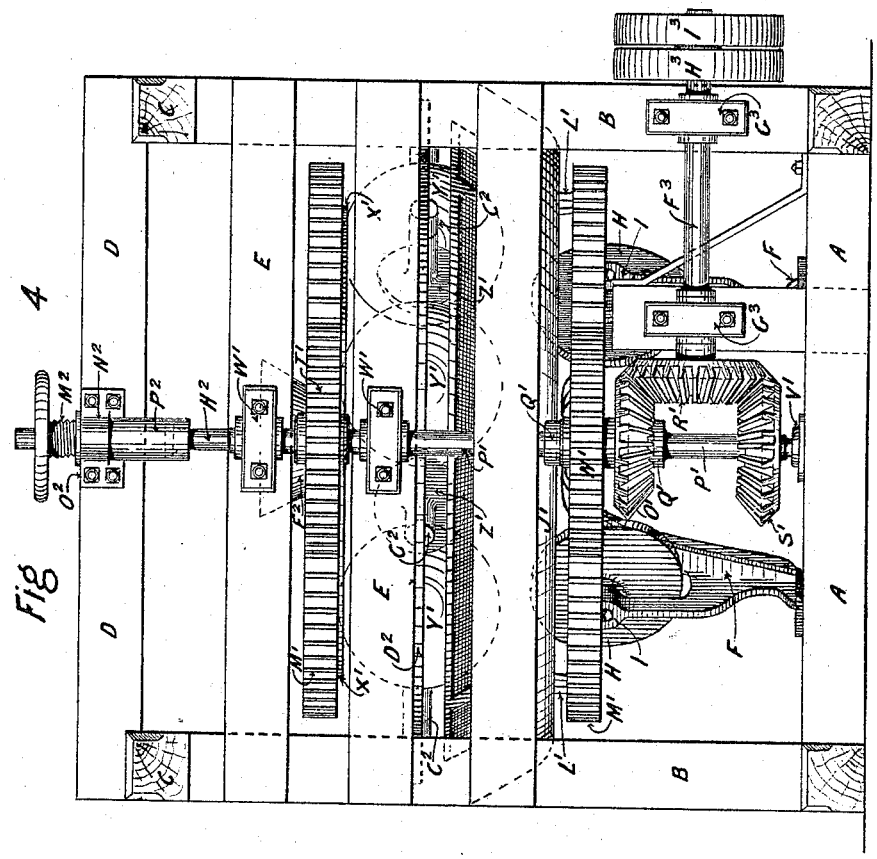
Figure 5:
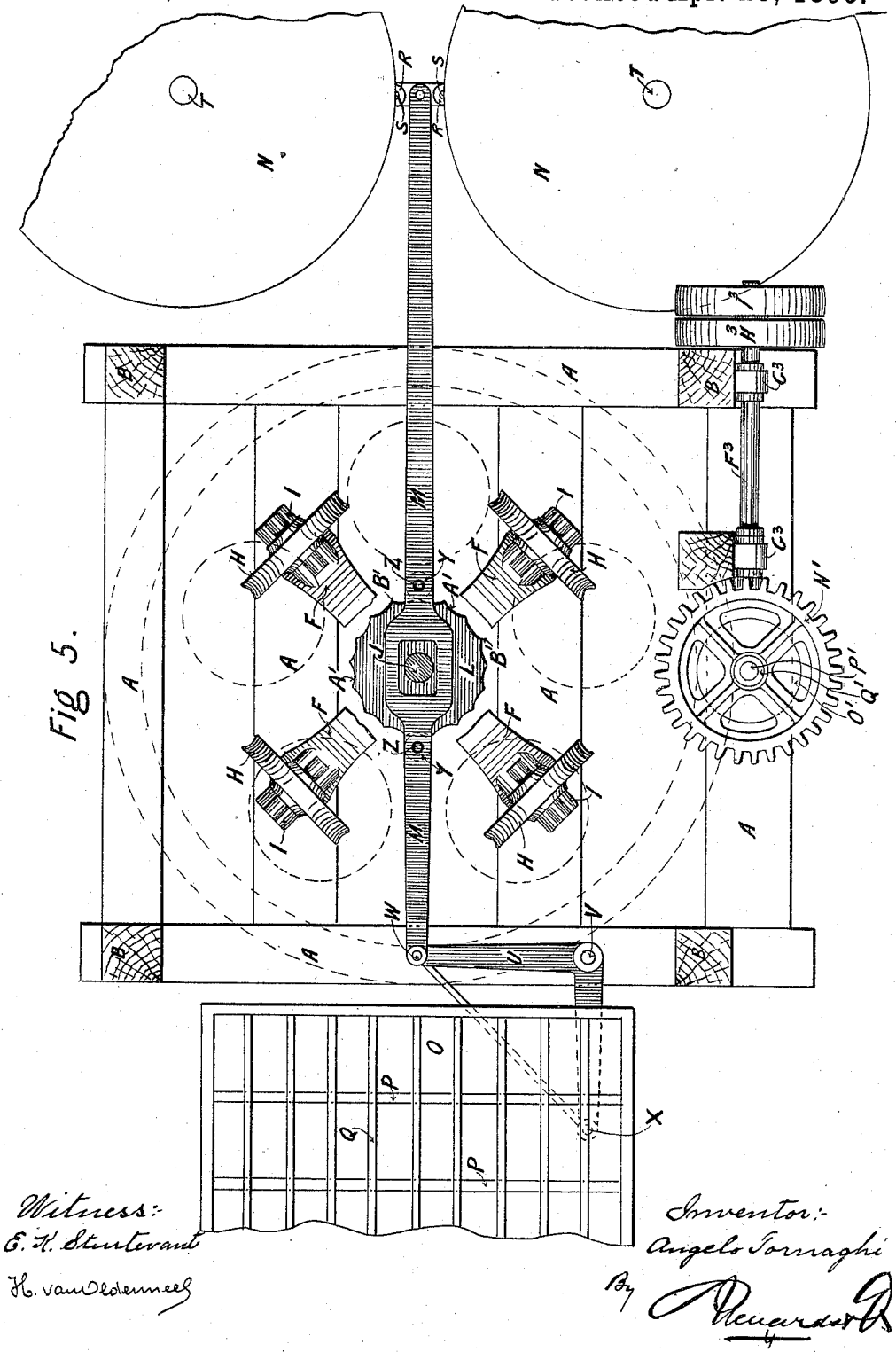
Figure 6:
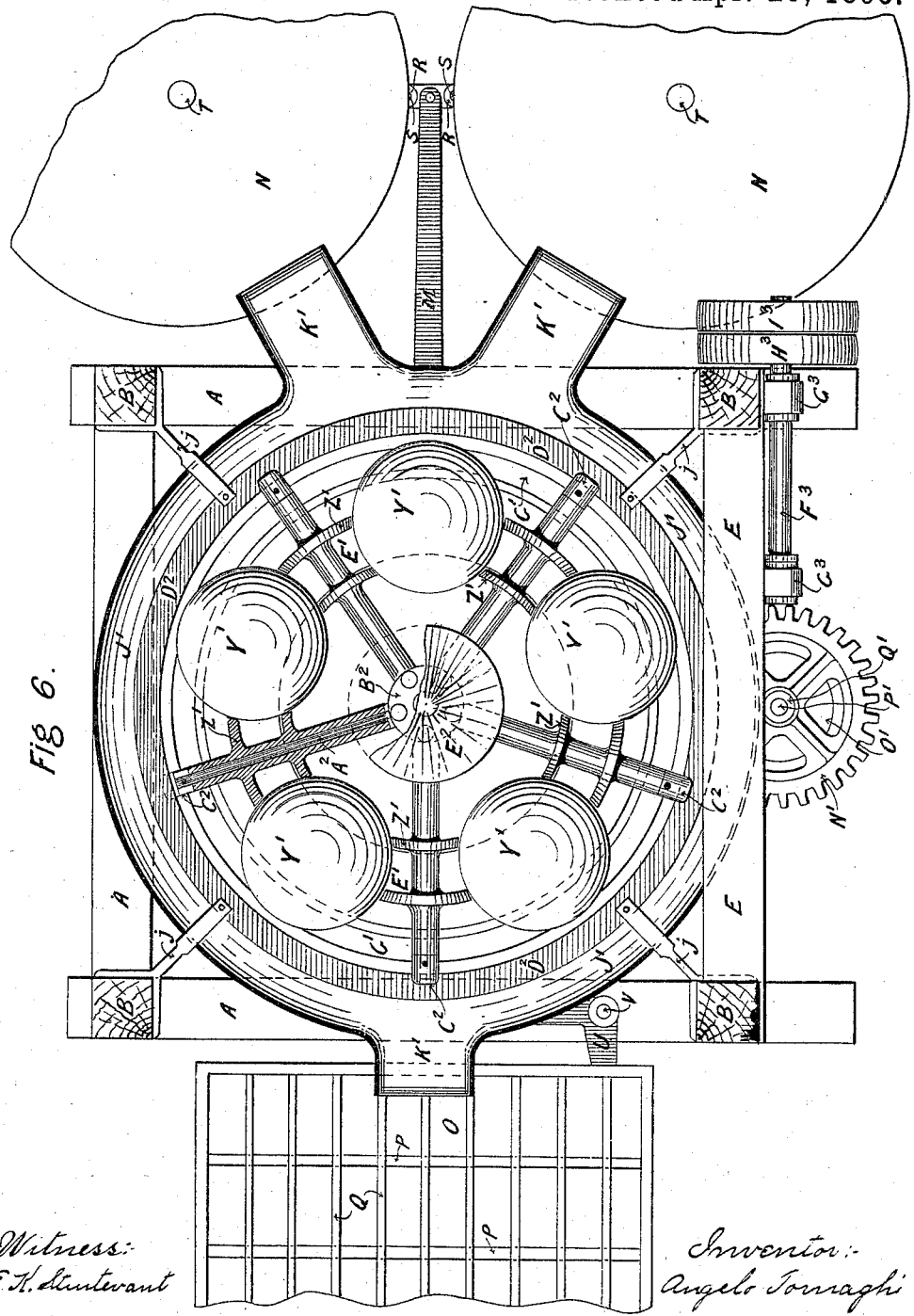
Figure 7:
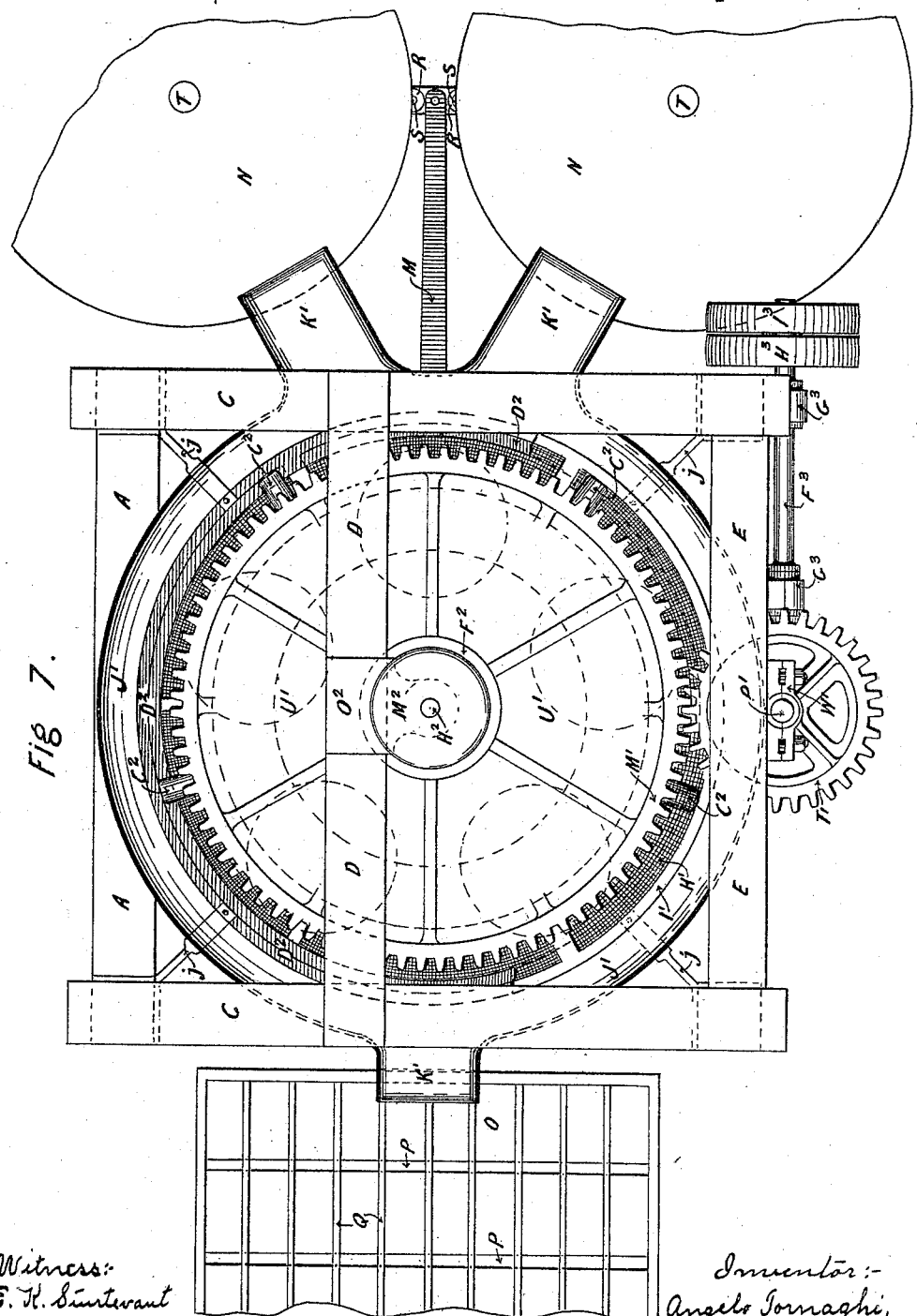
Figure 11:
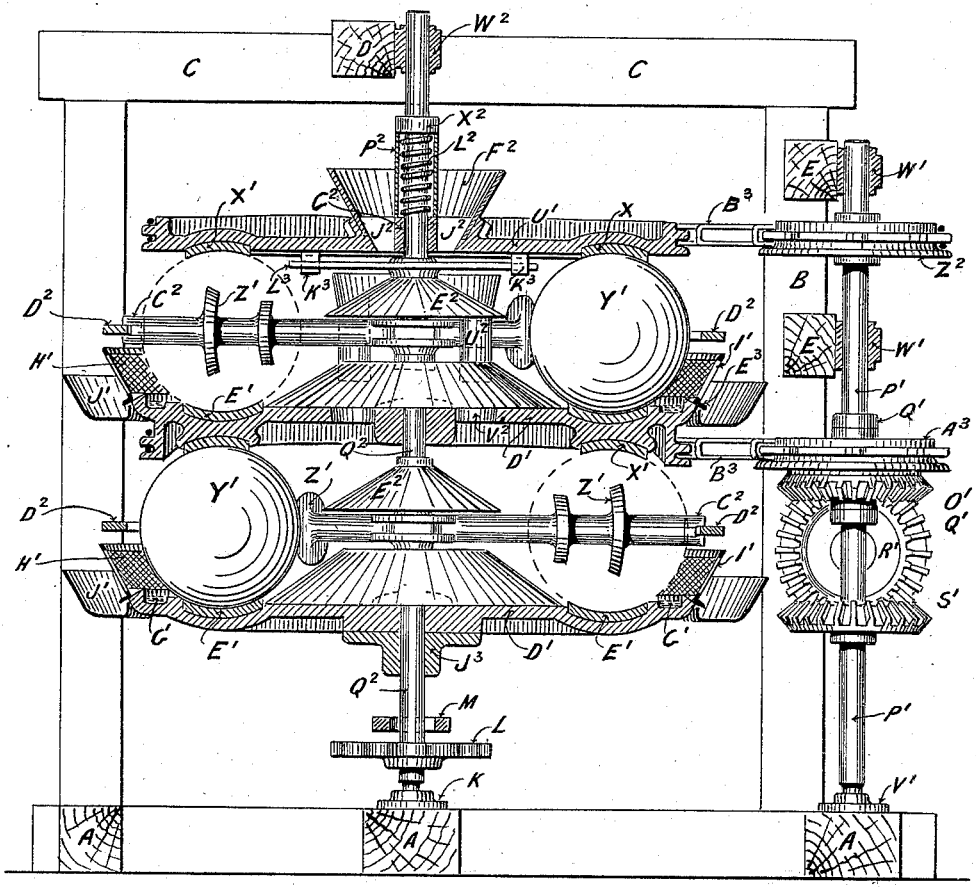
Figure 12:
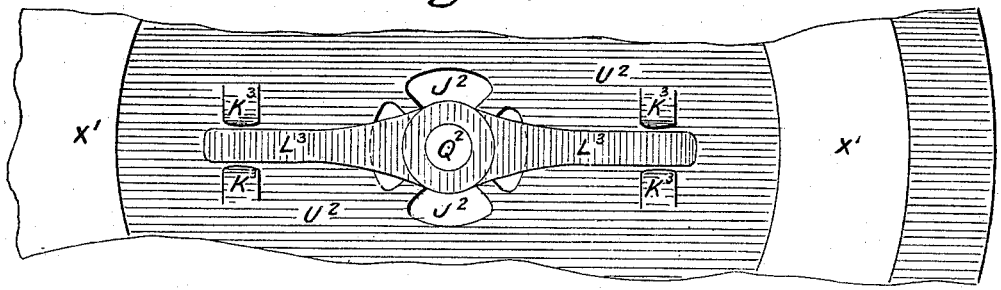

Figure 1 is a vertical section of one form of pulverizer, showing the method of operating the trays in contrary directions. Fig. 2 is a detail of the tappet wheel and impulse rod. Fig. 3 is a section of driving spindle showing bevel and spur wheels running loosely thereon. Fig. 4 is a side elevation of Fig. 1, showing driving gear. Fig. 5 is a plan of pulverizer showing friction rollers and tappet movement operating concentrators and shaking table. Fig. 6 is a plan of pulverizer with top tray removed. Fig. 7 is a plan of pulverizer with top tray in position. Fig. 8 is a vertical section showing modification in construction of pulverizer, showing a series of trays with crushing balls substituted for friction rollers, and driven by chain bands in combination with sprocket wheel, showing also feeding chutes. Fig. 9 is a detail of track for supporting rods of distance rollers. Fig. 9$^a$ is a plan of cone showing funnels or delivery spouts. Fig. 10 is a plan showing method of using chain bands and sprocket wheels for rotating trays. Fig. 11 is a vertical section of another form of pulverizer, showing a series of trays, the bottom tray rotatable. Fig. 12 is a detail bottom plan view of means for driving upper tray U'.

In the various figures, A is the foundation frame-work; B, the vertical timbers; C, cap pieces; D, transverse timbers; E, bracing timbers carrying driving gear; F, standards for friction rollers; G, bearing for vertical spindle secured to F; H, friction rollers; I, bearings for H secured to F; J, vertical spindle supported in toe step K and carrying tappet wheel L; M, impulse rod actuated by L for operating, so as to gently vibrate, the concentrating trays N and the shaking table O provided with mercury-wells P and parallel copper strips or bars Q. This table has an inclination and will feed a similar table placed beneath it, or a series of such tables, all of which would be vibrated by means of the impulse rod M. In the case of the trays N the impulse rod is secured to the sides of the trays by means of the clips R which are made to clasp the rods S which hold a series of trays attached to one central spindle T the required distance apart. The aforesaid shaking table is vibrated by means of a bell crank U pivoted to the pin V and attached to the impulse rod with a pin W, the other end of the bell crank being attached to the table with a pin X, shown in dotted lines.

Y. Y. are friction rollers running on the studs Z inserted in the impulse rod. These rollers are operated by means of the tappet wheel L, whose edge is shaped with hollows or indentations A', the number of such indentations being preferably odd, say seventeen, which has the effect of causing the friction rollers to occupy the position shown on the drawings, one being in the hollow or indentation A', and the other on the point B'. This peculiar construction insures a continuous vibratory motion being imparted to the trays N and table O.

C' is of a flange on J for securing lower revolving tray D'; E', removable roller plate attached to D'; F', guide piece for friction rollers H; G', mercury wells outside of E'; H', gratings for screening pulverized material; I', metal frame for H' secured to flange of D'; J', suspended receiving tray secured in any suitable manner to the framework; K', discharge portion of J' for delivering pulverized material on to concentrating trays N and shaking tables O; L', brackets secured to under side of D' for supporting main driving wheel M' which is operated by the spur wheel N' attached to bevel wheel O', both running loosely upon vertical spindle P', and kept in position by fast collars Q'.

O' is operated by the miter wheel R', which also sets in motion spur wheel S' keyed to P' which has upon its upper end spur wheel T' similar to N' for actuating the upper tray U' which is also supplied with a main driving wheel M' and is rotated in the contrary direction to D'.

V' is toe step supporting P'.

W' are bearings for P' secured to E.

X' is removable roller plate attached to U'; Y', metal crushing spheres actuated by revolving trays D' and U'; Z', flanged distance rollers running upon rod $A^2$ attached to revolving boss $B^2$ supported upon upper end of J; $C^2$, forked end of $A^2$ running upon a track $D^2$ secured to any convenient part of the framework; $E^2$, delivery cone fitted on upper end of J to receive material to be pulverized, which passes through a hopper $F^2$ secured to U'; $G^2$, bridge and toe step for pressure spindle $H^2$, having covering metal cone $I^2$ for diverting the material through apertures $J^2$; $K^2$, thrust collar on $H^2$ to take pressure of spring $L^2$ which is kept in position by screw wheel $M^2$ running in bearing bracket $N^2$ secured to D by flange $O^2$. The pressure spring $L^2$ has a covering tube $P^2$ suspended from $N^2$.

In Fig. 8 where a series of trays are shown, they are held in position by means of a central spindle $Q^2$ passing through the boss $R^2$ of the stationary tray $S^2$, thence through the various rotating trays D' which, in this modification, are provided with both upper and lower removable roller plates X' and E', the upper tray U' being similar in construction to that shown in Fig. 1. In this modification the friction rollers H are dispensed with and the crushing spheres Y' substituted being used as friction rollers, and, if necessary, also for pulverizing purposes. The tray $S^3$ may be secured rigidly to the spindle $Q^2$, but the other trays D' and U' will run loosely upon $Q^2$. The revolving bosses $B^2$ are supported in position by means of the collars $T^2$. One method of feeding this series of trays is shown, the material to be pulverized being passed through the hopper $F^2$, whence it falls on to the surface of the cone $E^2$ and also through the funnels $U^2$ provided in the said cone, whence it passes down through openings $V^2$ in the revolving tray D'. This is repeated at each succeeding tray. I am not restricted to this method of feeding, which may also be done by means of chutes diverting the material from the outside on to the roller path. The upper end of the spindle $Q^2$ is supported in a bearing $W^2$ attached to D. A screw is provided at the upper end having a clamping nut $X^2$ for keeping the spring $L^2$ pressing against $G^2$. By this device any straining of the framework is obviated, the strain being taken by the said clamping nut $X^2$ and the head $Y^2$ of the spindle $Q^2$. The tappet wheel L is, in this modification, secured to spindle P'. The same class of bevel gearing is used as in Fig. 1, but in lieu of the spur wheels N' and T', sprocket wheels $Z^2$ and $A^3$ are used, (the latter being operated in a contrary direction to $Z^2$,) for operating the trays by means of chain bands $B^3$.

The method of applying the chain bands is shown in Fig. 10. $C^3$ is a loose pulley running upon spindle $D^3$ which is attached to the framework in any convenient position. The receiving trays in this modification are the same as for Fig. 1, but the upper ones may, if it is desired, be dispensed with, and the lowest one only be used, in which case the projecting lips $E^3$ would be extended sufficiently to allow the material to fall into the lower tray. The bevel wheel R' is secured to the shaft $F^3$ which runs in bearings $G^3$. On the outer end of the shaft $F^3$ are the fast and loose pulleys $H^3$ and $I^3$.

Having thus particularly described and ascertained the nature of my said invention, and in what manner the same is carried into effect, I declare that I do not know or believe that any other person than myself is the true and first inventor of the above described "improvements in the construction of ore pulverizers, and in the manner of operating the same in combination with amalgamating and concentrating apparatus."

What I claim, and desire to secure by Letters Patent of the United States of America, is—

1. In combination in a pulverizer, the vertical shaft, the tray carried thereby, the spheres in said tray, the radial arms carried by the shaft, the rollers on said arms bearing on the spheres, the funnel carried by and extending through the upper tray and the cone on the shaft for directing the material to the spheres, said cone being arranged below the said funnel substantially as described.

2. In combination, the tray, the vertical shaft carrying the same, the pulverizing means, the concentrating pan and shaking table, the receiving tray extending about the pulverizing tray and arranged for directing the material to the shaking table and concentrating pan, and means for operating the concentrating pan and shaking table from the vertical shaft, substantially as described.

3. In combination, the vertical shaft, the pulverizing tray operated therefrom with pulverizing means, the receiving tray, the reciprocating pan and shaking table arranged to receive the material therefrom, the tappet on the vertical shaft, the rod M reciprocated thereby, and the connections between the opposite ends of said rod and the reciprocating pans and shaking tables respectively, substantially as described.

4. In combination, the central shaft, the series of trays thereon with interposed pulverizing spheres, an upper tray bearing on the upper spheres, the spring for forcing the tray down, the hopper on the upper tray and the cones and the funnels between the trays, substantially as described.

5. In combination, the tray, the pulverizer spheres the rollers to press thereon, the central shaft carrying the rollers and the track for the outer ends of the roller arms, substantially as described.

In witness whereof I have hereunto set my hand in presence of two witnesses.

ANGELO TORNAGHI.

Witnesses:
JOHN J. STONE,
HARRY A. SMEDLEY.